UNITED STATES PATENT OFFICE.

GEORG HEINRICH GONTARD, OF PROBSTDEUBEN, AND ARTHUR KELLER, OF LEIPZIG-SCHLEUSSIG, GERMANY, ASSIGNORS, BY MESNE ASSIGNMENTS, TO THE CHEMICAL FOUNDATION, INC., A CORPORATION OF DELAWARE.

PROCESS OF PREPARATION OF OXALIC ACID.

1,356,137.      Specification of Letters Patent.      Patented Oct. 19, 1920.

No Drawing. Application filed December 30, 1914, Serial No. 879,726. Renewed March 16, 1920. Serial No. 366,439.

*To all whom it may concern:*

Be it known that we, GEORG HEINRICH GONTARD and ARTHUR KELLER, both subjects of the King of Saxony, and residents, respectively, of Probstdeuben, Saxony, Germany, and Leipzig-Schleussig, Saxony, Germany, have invented new and useful Improvements in Processes of Preparation of Oxalic Acid, of which the following is a full, clear, and exact specification.

This invention relates to a process for the preparation of oxalic acid from carbohydrates by means of nitric acid.

That sugar (saccharose), starch, detrin and the like may be oxidized to oxalic acid by means of nitric acid in presence of catalyzing agents is well known. However, in this process a rather large excess of nitric acid must be used, only about ⅔ of the nitric acid being necessary for oxidizing the saccharose or the like, while about ⅓ remains in the mother liquor from which the oxalic acid is crystallized.

For economically carrying on these processes a rather concentrated nitric acid must be used and the reaction mixture kept at a temperature of about 30° C., especially at the beginning of the reaction, as otherwise the oxalic acid formed will be further oxidized to carbon dioxid and water. In order to complete the reaction with the nitric acid present and which is more and more diluted, it is necessary to heat toward the end of the operation.

When saccharose and the like is brought into reaction with concentrated nitric acid, the temperature rises and it is therefore necessary to cool the mixture thoroughly, while at the end of the reaction the cooled mixture must be heated. A decided loss of heat therefore ensues.

The mother liquor, from which the oxalic acid crystallizes, is a nitric acid of about 33% strength. It is therefore obvious that the oxalic acid crystals will include certain quantities of nitric acid which of course can easily be removed by re-crystallization, but which are lost. On the other hand it is necessary to avoid every loss of nitric acid as far as possible if the mother liquors are to be used to collect the nitric oxid (NO) and nitrogen dioxid ($NO_2$) gases which escape from the mixture during the reaction and form nitric acid in contact with oxygen, in order to utilize the mother liquors thus enriched for oxidizing new quantities of saccharose.

It is easier to collect the nitrogen oxids escaping from the mixture in and to bind them to sulfuric acid than to water or dilute nitric acid with which they yield less concentrated acids which must, at least partly, be concentrated.

Therefore, according to this invention a mixture of nitric acid and sulfuric acid is utilized for the oxidation of the carbohydrates. Though these mixtures contain little more nitric acid than is necessary for the oxidation, it has been found according to this invention that saccharose and other carbohydrates can in this manner be oxidized by means of an acid mixture containing 30% of $HNO_3$ and even less. In this manner the heat of reaction can be utilized without danger of decomposition, and the time of reaction is reduced to a few hours. Further it is possible to so conduct the operation that the mother liquors are free from nitric acid or contain only small traces thereof. Consequently the crystallized oxalic acid contains very little nitric acid and the whole quantity of nitric acid escaping in the form of oxids of nitrogen can easily, in the form of nitric acid, be collected in and bound to the mother liquor obtained from the crystallization and forming a dilute sulfuric acid. The saccharose is probably first hydrolyzed in the presence of dilute sulfuric acid when heated to d-glucose and d-fructose which are then oxidized by the nitric acid and yield oxalic acid. While in the absence of sulfuric acid the complete crystallization of the oxalic acid from the mother liquors requires several days, it is completed in 24 hours if sulfuric acid is present.

Consequently by the process according to this invention firstly the time required by the reaction is reduced to a minimum as the reaction heat can be utilized without any danger of decomposition, and secondly the quantity of nitric acid necessary for the oxidation can be recovered and again utilized for the process as the nitrogen oxids formed can be wholly reoxidized by means of air and water to form nitric acid. Therefore the process according to this invention is a remarkable progress when compared with the known processes above referred to.

It has already been proposed to add a very small quantity of sulfuric acid in the preparation of oxalic acid by oxidizing saccharose by means of nitric acid in order to facilitate the decomposition. However, this process has the same drawbacks as those above referred to, viz., it was necessary to use a large excess of nitric acid and there was the danger of the oxalic acid being further oxidized to carbon dioxid, while in the process according to this invention much less nitric acid is sufficient and there is little danger of further oxidation, as the mother liquors are low in nitric acid content. Moreover, the collection of the escaping oxids of nitrogen is greatly facilitated.

The yield of crystallized oxalic acid according to the present process is on an average 142 parts by weight from 100 parts of saccharose, while in the known processes much smaller quantities only can be obtained on a commercial scale and in every case the loss of heat above referred to could not be avoided nor the other advantages of the present process realized.

Example: 100 parts by weight of saccharose are treated with 320 parts of sulfuric acid of 100% strength, 300 parts of nitric acid of 100% strength and 380 parts of water in the presence of catalytic agents, such as vanadium compounds, for instance vanadium pentoxid $V_2O_5$, molybdenum salts or manganese salts. The oxidation is completed within 2 hours, while the temperature is allowed to rise up to 70° C. Upon re-crystallization from water 142 parts of pure crystallized oxalic acid are obtained.

Instead of saccharose, for instance also starch, dextrin, disintegrated cellulose or other carbohydrates can be used.

What we claim is:—

1. The hereinbefore described process of preparation of oxalic acid which process consists in treating 100 parts by weight of saccharose with 320 parts of sulfuric acid of 100% strength, 300 parts of nitric acid of 100% strength and 380 parts of water in presence of a catalyzing agent, substantially as described.

2. The hereinbefore described process of preparation of oxalic acid which process consists in treating 100 parts by weight of saccharose with 320 parts of sulfuric acid 100% strength, 300 parts of nitric acid of 100% strength and 380 parts of water in presence of vanadium pentoxid, substantially as described.

In testimony that we claim the foregoing as our invention, we have signed our names in presence of two subscribing witnesses.

GEORG HEINRICH GONTARD.
ARTHUR KELLER.

Witnesses:
RUDOLPH FRICKE,
OSCAR FRERING.